US012749484B2

(12) United States Patent
Kraljic et al.

(10) Patent No.: US 12,749,484 B2
(45) Date of Patent: Sep. 29, 2026

(54) DYNAMICALLY ADAPTING ASSISTANT RESPONSES

(71) Applicant: GOOGLE LLC, Mountain View, CA (US)

(72) Inventors: Tanya Kraljic, Ridgewood, NJ (US); Miranda Callahan, New York City, NY (US); Yi Sing Alex Loh, New York, NY (US); Darla Sharp, Alameda, CA (US)

(73) Assignee: GOOGLE LLC, Mountain View, CA (US)

( * ) Notice: Subject to any disclaimer, the term of this patent is extended or adjusted under 35 U.S.C. 154(b) by 126 days.

(21) Appl. No.: 18/412,004

(22) Filed: Jan. 12, 2024

(65) Prior Publication Data

US 2024/0153502 A1 May 9, 2024

Related U.S. Application Data

(63) Continuation of application No. 16/621,371, filed as application No. PCT/US2019/020394 on Mar. 1, 2019, now Pat. No. 11,875,790.

(51) Int. Cl.
*G10L 15/22* (2006.01)
*G10L 13/02* (2013.01)
(Continued)

(52) U.S. Cl.
CPC .............. *G10L 15/22* (2013.01); *G10L 13/02* (2013.01); *G10L 15/1815* (2013.01); (Continued)

(58) Field of Classification Search
CPC ......... G10L 13/00; G10L 13/02; G10L 15/00; G10L 15/22; G10L 15/30; G10L 15/1815; G10L 2015/223; G10L 2015/228
See application file for complete search history.

(56) References Cited

U.S. PATENT DOCUMENTS

2004/0179659 A1 9/2004 Byrne
2005/0177374 A1* 8/2005 Cooper .................. G10L 15/22 704/E15.04
(Continued)

FOREIGN PATENT DOCUMENTS

CN 107003797 8/2017
CN 108369808 8/2018
(Continued)

OTHER PUBLICATIONS

Nasteski, V., 2017. An overview of the supervised machine learning methods. Horizons. b, 4(51-62), p. 56. (Year: 2017).*
(Continued)

*Primary Examiner* — Sean E Serraguard
(74) *Attorney, Agent, or Firm* — Gray Ice Higdon

(57) ABSTRACT

Techniques are disclosed that enable dynamically adapting an automated assistant response using a dynamic familiarity measure. Various implementations process received user input to determine at least one intent, and generate a familiarity measure by processing intent specific parameters and intent agnostic parameters using a machine learning model. An automated assistant response is then determined that is based on the intent and that is based on the familiarity measure. The assistant response is responsive to the user input, and is adapted to the familiarity measure. For example, the assistant response can be more abbreviated and/or more resource efficient as the familiarity measure becomes more indicative of familiarity.

20 Claims, 4 Drawing Sheets

(51) Int. Cl.
*G10L 15/18* (2013.01)
*G10L 15/30* (2013.01)

(52) U.S. Cl.
CPC ........ *G10L 15/30* (2013.01); *G10L 2015/223* (2013.01); *G10L 2015/228* (2013.01)

(56) References Cited

U.S. PATENT DOCUMENTS

| | | | | |
|---|---|---|---|---|
| 2008/0027924 | A1* | 1/2008 | Hamilton ............ | G06F 16/9535 707/999.005 |
| 2016/0092160 | A1 | 3/2016 | Graff et al. | |
| 2016/0148610 | A1 | 5/2016 | Kennewick et al. | |
| 2016/0210116 | A1 | 7/2016 | Kim | |
| 2016/0343372 | A1 | 11/2016 | Motomura et al. | |
| 2017/0070537 | A1 | 3/2017 | Zhang | |
| 2017/0083964 | A1* | 3/2017 | Novotny ............ | G06Q 30/0269 |
| 2017/0358302 | A1 | 12/2017 | Orr et al. | |
| 2018/0033432 | A1 | 2/2018 | Ikeno | |
| 2018/0054523 | A1 | 2/2018 | Zhang et al. | |
| 2018/0060031 | A1 | 3/2018 | Boesen | |
| 2018/0232645 | A1 | 8/2018 | Finkelstein | |
| 2018/0233132 | A1 | 8/2018 | Herold et al. | |
| 2019/0206411 | A1 | 7/2019 | Li | |
| 2020/0005375 | A1* | 1/2020 | Sharan .................... | G06F 3/167 |
| 2020/0043471 | A1 | 2/2020 | Ma et al. | |
| 2020/0258514 | A1 | 8/2020 | Park | |
| 2020/0279553 | A1* | 9/2020 | Mcduff ................... | G10L 25/78 |
| 2021/0082420 | A1 | 3/2021 | Kraljic et al. | |

FOREIGN PATENT DOCUMENTS

| | | |
|---|---|---|
| CN | 109074292 | 12/2018 |
| JP | 2010107614 | 5/2010 |
| JP | 2016071050 | 5/2016 |
| JP | 2018021953 | 2/2018 |
| KR | 20160147303 | 12/2016 |
| KR | 20180109633 | 10/2018 |
| KR | 20180134994 | 12/2018 |
| WO | 2017196991 | 11/2017 |
| WO | 2018071779 | 4/2018 |
| WO | 2019030532 | 2/2019 |
| WO | 2020180286 | 9/2020 |

OTHER PUBLICATIONS

China National Intellectual Property Administration; Grant Notice issued in Application No. 201980092024.5; 4 pages; dated Jan. 12, 2024.
European Patent Office; Minutes in accordance with Rule 124(4) EPC issued in Application No. 19710974.7; 5 pages; dated Feb. 12, 2024.
European Patent Office; Intention to Grant issued in Application No. 19710974.7; 51 pages; dated Feb. 16, 2024.
The Korean Intellectual Property Office; Notice of Office Action issued in Application No. 10-2021-7031803; 16 pages; dated Sep. 24, 2024.
China National Intellectual Property Administration; Notification of First Office Action issued in Application No. 201980092024.5; 12 pages; dated Aug. 23, 2023.
European Patent Office; Summons to attend oral proceedings issued in Application No. 19710974.7; 8 pages: dated Jun. 23, 2023.
Japanese Patent Office; Decision of Rejection issued in Application No. 2021-544624, 10 pages, dated Apr. 10, 2023.
Japanese Patent Office; Notice of Reasons for Rejection issued in App. No. 2021-544624, 11 pages, dated Oct. 3, 2022.
Australian Government; Notice of Acceptance for Patent Application issued in Application No. 2019432912, 8 pages, dated Sep. 27, 2022.
Australian Government; First Examination Report issued in Application No. 2019432912. 3 pages, dated Jun. 6, 2022.
Intellectual Property India; Examination Report issued in Application No. IN202127032169; 9 pages; dated Mar. 28, 2022.
European Patent Office; Communication issued in Application No. 19710974.7, 5 pages, dated Jan. 17, 2022.
European Patent Office; International Search Report and Written Opinion of Ser. No. PCT/US2019/020394; 12 pages; dated Nov. 22, 2019.

* cited by examiner

DYNAMICALLY ADAPTING ASSISTANT RESPONSES

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

SUMMARY

Implementations described herein are directed to dynamically adapting assistant responses based on a dynamic familiarity measure of a user. As described herein, a familiarity measure of the user can be generated based on various parameters that change over time, such as parameters that quantify one or more aspects of historical interactions, of the user, with the automated assistant. Accordingly, the familiarity measure of the user will dynamically change (e.g., increase and/or decrease) overtime as the parameters utilized in determining the familiarity measure change. Moreover, in various implementations the familiarity measure, that is generated in determining whether and/or how to adapt an automated assistant response, is tailored to one or more intents (and/or optionally to value(s)/argument(s) of the intent(s)) associated with user input to which the automated assistant response is responsive. For example, one or more of the parameters utilized in generating the response can be particularized to intent(s) included in the request, and optionally to related intent(s). Accordingly, a familiarity measure that is generated for a given user can differ in dependence on the intent(s) that are associated with user input from the user.

Implementations adapt assistant responses to be more abbreviated and/or resource efficient as the familiarity measure becomes more indicative of familiarity. For example, assume a spoken command of "change my thermostat schedule for Mondays" is provided to an automated assistant interface of a client device. When the familiarity measure of the user is indicative of no/little familiarity, the response can be relatively robust to provide extra guidance to the user in accomplishing the task. For example, the response can be computer generated speech of "sure, please state the times and desired thermostat temperature at each time". When the familiarity of the user is indicative of more familiarity, the response can be abridged computer generated speech, such as "sure, times and desired temperatures please". When the familiarity measure of the user is indicative of even more familiarity, the response can be even further abridged (e.g., "times and temps"). As described in more detail herein, various techniques can be utilized to generate responses that conform to a determined familiarity measure. For example, some implementations can select an appropriate response form a plurality of candidate responses that are each associated with a corresponding familiarity measure. Also, for example, some implementations can obtain an initial/standard response, then abridge the initial response in accordance with the familiarity measure. For instance, text of the initial response can be summarized, term(s) of the initial response can be removed, term(s) of the initial response can be replaced with corresponding pronouns, and/or the initial response can otherwise be manipulated to generate a more abridged version.

Moreover, when the user provides (responsive to the request for desired time(s) and temperature(s)) further spoken input with the desired time(s) and temperature(s), a further response from the automated assistant can be dynamically adapted based on the familiarity measure. For example: when indicative of no/little familiarity it can be computer generated speech of "your schedule for Mondays has been adapted to [restatement of times and temperatures]"; when indicative of more familiarity it can be computer generated speech of "your schedule is adapted"; and when indicative of even more familiarity it can be simply a confirmatory "ding" (or other non-speech sound) that can optionally be pre-stored on the client device.

Accordingly, various implementations set forth techniques for guiding human/automated assistant interactions in the performance of technical tasks—and do so in a manner that enables the interactions to be more efficient as the familiarity measure of the user become more indicative of familiarity. For example, as the familiarity measure of the user becomes more indicative of familiarity, more abridged responses are provided. The more abridged responses can comprise less bytes than less abridged responses, thereby utilizing less network resources when generated at an automated assistant server and transmitted to the client device. Further, the abridged responses, when rendered as audible output at the client device, can be rendered more efficiently by the client device. Yet further, the abridged responses can be rendered more quickly, thereby reducing the duration of the human/automated assistant interaction and lessening the duration of a communications session between the client device and remote automated assistant components. Moreover, while less abridged (or not abridged) responses are provided when the familiarity measure of the user is less indicative of familiarity, human/automated assistant interactions are still guided in an efficient manner. For example, the less abridged responses can provide more guidance to a less familiar user, thereby mitigating the need for the user to provide resource intensive follow-up prompts or other interactions to actively solicit additional guidance. As described herein, a familiarity measure of a user for intent(s) can be indicative of lesser familiarity for initial input(s) of the user for those intent(s), as a result of the user not providing any (or few) inputs for the intent(s) over a recent time period, and/or as a result of change of additional or alternative dynamic parameter(s) that are utilized in determining the familiarity measure.

In a variety of implementations, in addition to adapting assistant responses based on a dynamic familiarity measure, command(s) issued responsive to user input can also be adapted based on the familiarity measure and/or historical user inputs. For example, a user can provide input of "turn up the thermostat" and, when a familiarity measure of the user indicates low familiarity, the assistant can provide (based on the familiarity measure) the response "please specify how many degrees, or a default of one degree will be used". Command(s) will then be provided to control the thermostat based on the user's response (if any). For example, if the user doesn't provide a response, the command(s) will cause the thermostat to increment one degree. On the other hand, if a response is provided the command(s)

will cause the thermostat to increment in accordance with the user's response. When the familiarity measure of the user indicates high familiarity, a response to input of "turn up the thermostat" can simply be "OK", or a "ding" sound. In some of those implementations, the historical userqj input(s) of the user in response to past prompts of "please specify how many degrees, or a default of one degree will be used" will be used to automatically determine the increment amount specified by the command(s) provided to control the thermostat. For example, if the user never specified an amount or only ever specified one degree, then one degree can be utilized. Also, for example, if the user always specified three degrees, then three degrees can be utilized.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
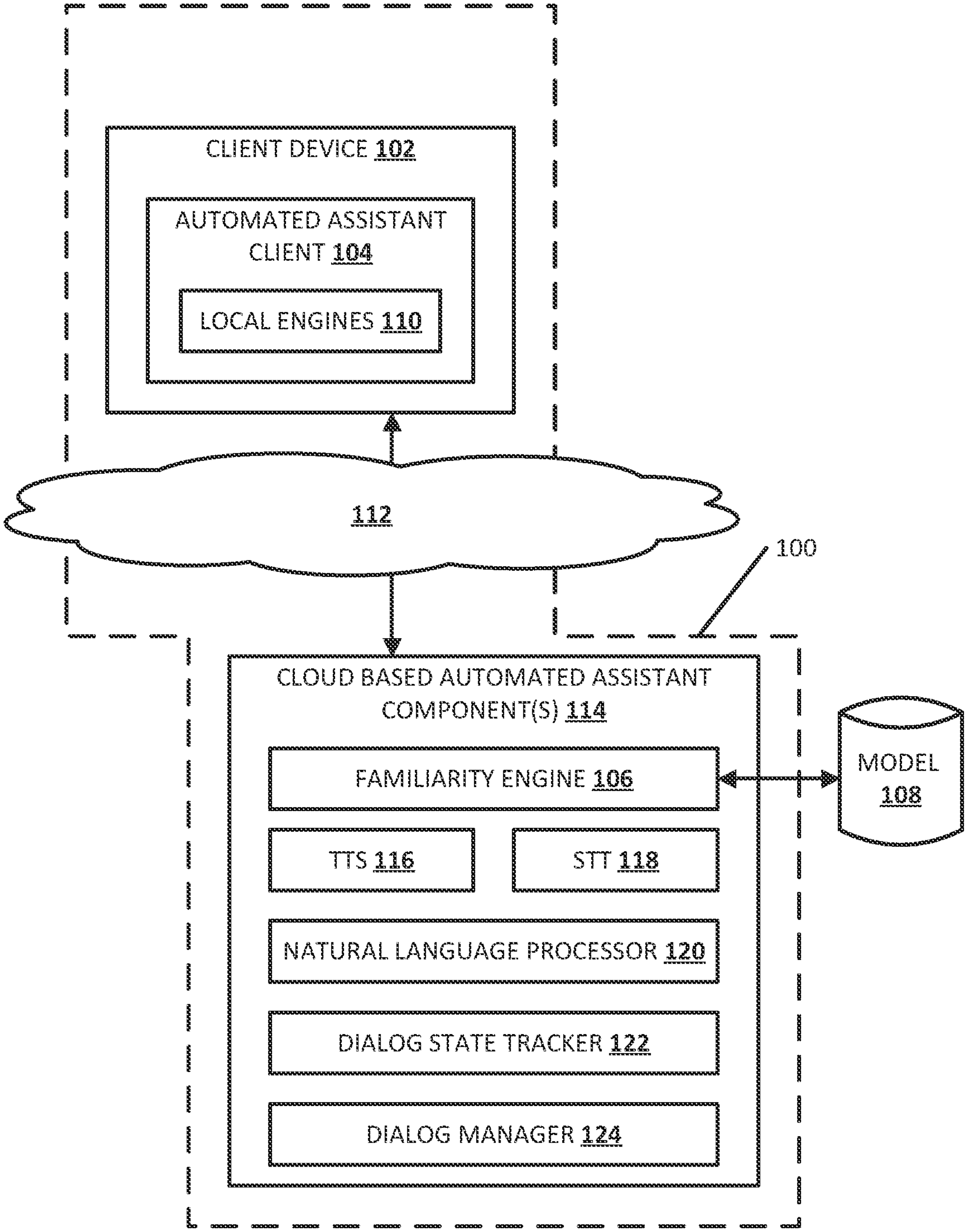
FIG. 1 is a block diagram illustrating an example environment in which various implementations can be implemented.

In various implementations, user interface input provided by a user of an automated assistant of a client device (e.g., natural language spoken input, text input, gesture input, etc.) can be processed to determine one or more intents associated with the user interface input. The intent(s) can include at least one corresponding intent of the user interface input, and optionally one or more related intents. For example, a user can provide spoken input of "Assistant, turn off the kitchen light" to an automated assistant, where the corresponding intent is to turn off a connected smart light. One or more values can be associated with the intent such as, in this case, a value that indicates a "kitchen light" is an identifier of the connected smart light to be turned off.

An automated assistant often provides a response that is rendered responsive to the spoken input. For example, in addition to transmitting the appropriate command(s) to cause the kitchen light to be turned off, the automated assistant can also provide a spoken response, via a speaker of a client device, such as a spoken response of "Turning off the kitchen light". Implementations described herein can be utilized to selectively generate an abridged response (i.e., a shortened response) for providing in lieu of an initial automated assistant response. For example, where "Turning off the kitchen light" is the initial/standard response, that response can be provided when a familiarity measure of a user indicates low familiarity for a "turning on/off a light" intent, "controlling a smart light" intent, and/or other intent(s) associated with the user interface input. However, in response to the familiarity measure indicating more familiarity with the intent(s), the automated assistant can provide the user an abridged spoken response such as "turning off the light" (that omits the modifier "kitchen"), "turning it off" (that replaces "kitchen light" with the pronoun "it"), or only a sound without providing any spoken response. Additional and/or alternative abridged responses may be provided. Moreover, and as described herein, different abridged response can be provided over time as the familiarity measure of the user for the intent(s) dynamically changes. For example, "turning off the light" can be replaced with "turning it off", which can then be replaced with only a sound, which can then be replaced with "turning it off" (e.g., reverting "back" to "turning it off" based on the familiarity measure becoming less indicative of familiarity due to lack of automated assistant interactions by the user).

As described herein, an initial response is a response provided to a user by an automated assistant when providing a response to a particular intent and frequently provides detailed information relating to the corresponding intent. For example, "Ok, turning off [total number of smart lights] lights" (where the total number of lights is the total number of connected smart lights being controlled) is an initial response associated with natural language user input of "Assistant, turn off all lights". Similarly, the response "OK, turning off [total number of smart lights] lights" is the initial response associated with natural language input of "Assistant, turn off all kitchen lights". In other words, both natural language spoken inputs provided by a user with the same intent correspond to the same initial response.

In many implementations, the initial response can be truncated into an abridged response based on the value of a familiarity measure, where the familiarity measure is determined based on one or more parameters indicating historical interactions of the user with the automated assistant. In various implementations, a familiarity measure can be determined by processing the parameters using a machine learning model such as a feed-forward neural network model, a convolutional neural network model, a recurrent neural network model, and/or additional neural network models.

Parameters utilized in determining the familiarity measure in a variety of implementations can include assistant type parameters, intent specific parameters, value specific parameters, device type parameters, and/or additional parameters. Assistant type parameters can include parameter(s) that are each based on historical interactions of a user with the automated assistant. For example, assistant type parameters can include the total number of interactions the user has had with the automated assistant on a particular client device, the total number of interactions the user has had with the automated assistant on any client device, the length of time the user has be using the automated assistant, the length of time since the user last used the automated assistant, the total number of interactions the user has had with the automated assistant in a temporal range (e.g., the last week, the last month), a frequency of interactions with the automated assistant (relative to some unit of time), and/or additional assistant type parameters. In various implementations, one or more (e.g., all) assistant type parameters are intent agnostic and/or value agnostic. In other words, those parameter(s) are based on a quantity of interactions without regard to whether those interactions relate to intent(s) and/or value(s) specified by user input for which a familiarity measure is being determined. However, such intent and/or value agnostic parameters can still be processed in generating a familiarity measure and can have a meaningful impact on the generated familiarity measure.

Intent specific parameters can include historical interactions of a user with the automated assistant for one or more specific intents. For example, intent specific parameters can include the total number of interactions of the user with the automated assistant for an intent at a specific client device, the total number of interactions of the user with the automated assistant for the intent at any client device, the length of time since the user last interacted with the automated assistant for the intent, the total number of interactions of the user with the automated assistant for the intent as well as related intents (e.g., "turn off the kitchen lights", "dim the kitchen lights", and "turn on the kitchen lights" are related intents), the length of time since the user has had an interaction with the automated assistant for the intent as well as related intents, the total number of interactions the user has had for the intent in a temporal range (e.g., the last week, the last month), a frequency of interactions with the automated assistant for the intent (relative to some unit of time), and/or additional intent related parameters. In some implementations, intent specific parameters can additionally or alternatively include one or more intent specific parameters that are specific to the intent(s) specified by user input and that are specific to one or more values/arguments for the intent(s). For example, for a first user input "dim office light", a value that identifies the "office light" can be specified for the dimming intent. Fora user input "dim living room lights", a value that identifies the "living room lights" can be specified for the dimming intent. Parameter(s) for the first input can include one or more that are based on a quantity of interactions of the user for the "dimming" intent and for the "office light" value. Parameter(s) for the second input can include one or more that are distinct from parameter(s) for the first input, as parameter(s) for the second input can include parameter(s) that are based on a quantity of interactions for the user for the "dimming" intent and for the "living room lights" value. Accordingly, in various implementations one or more parameters can be both intent specific and value specific.

Value specific parameters can include historical interactions of a user with the automated assistant for one or more values/arguments specified by a user input (optionally without regard to intent(s) specified by the user input). For example, value specific parameters can include the total number of interactions of the user with the automated assistant for value(s) at a specific client device, the total number of interactions of the user with the automated assistant for the value(s) at any client device, the length of time since the user last interacted with the automated assistant for the value(s), the total number of interactions the user has had for the value(s) in a temporal range (e.g., the last week, the last month), a frequency of interactions with the automated assistant for the value(s) (relative to some unit of time), and/or additional value related parameter(s). For instance, for user input of "turn off the thermostat", value specific parameter(s) can include one or more that are based on a quantity of interactions of the user that are related to the thermostat, including interactions for the thermostat for the "turn off" intent and/or for additional intents such as an "increase/decrease temperature" intent, a "change mode" (e.g., cooling mode, heating mode, away mode, eco mode, etc.) intent, and/or other intent(s). Accordingly, value specific parameter(s) can provide an indication of historical interactions of the user for one or more value(s), optionally without regard to intent. However, as mentioned above, in some implementations, parameter(s) can additionally or alternatively include one or more that are both value specific and intent specific.

Device type parameters can include information relating to the client device such as client device type, current client device modality, all available client device modalities, smart devices connected with the client device, and/or additional device parameters.

Additionally or alternatively, parameters can include one or more parameters relating to the current dialog session. For example, parameters can include the total number of dialog sessions where the user interacts with the automated assistant for the intent, the total number of interactions the user has with the automated assistant for the intent within the current session, the total number of interactions the user has with the automated assistant for the intent and for related intents within the current session, and/or additional session parameters. As used herein, a "dialog session" may include a logically self-contained exchange of one or more messages between a user and an automated assistant (and in some cases, other human participants). An automated assistant may differentiate between multiple dialog sessions with a user based on various signals, such as passage of time, change of user context (e.g., location, before/during/after a scheduled meeting, etc.) between sessions, detection of one or more intervening interactions between the user and a client device other than the dialog between the user and the automated assistant (e.g., the user switches applications for a while, the user walks away from then later returns to a standalone voice-activated product), locking/sleeping of the client device between sessions, change of client devices used to interface with one or more instances of the automated assistant, etc.

Once a familiarity score has been determined, techniques described herein can be utilized to generate the abridged version of the automated assistant response. In some implementations, a spoken portion of the initial response can be removed. In some such implementations, a visual, sound, and/or other portion(s) of the response remains after the spoken portion is removed. For example, an abridged response of the sound *ding* can be generated from an initial response of "OK, your reservation at Hypothetical Café has been made for 3 pm *ding*". In some implementations, a noun (and/or phrase including a noun) in an initial response can be replaced with a pronoun. For example, the abridged response of "OK, turning them off" can be generated from the initial response of "OK, turning the kitchen lights off" by replacing the phrase "kitchen lights" with the pronoun "them". In some implementations, a spoken initial response can be truncated to generate an abridged response. For example, the initial response of "OK, your reservation at Hypothetical Café has been made for Tuesday at 7 pm" can be truncated to generate an abridged response of "OK, your reservation at Hypothetical Café has been made".

In many implementations, the abridged version of the response can change over time (e.g., as a user's familiarity with an intent increases, as a user's familiarity with related intents increases, as a user's familiarity with an intent decreases, etc.). For example, a first abridged response can be generated from an initial response, and later a second abridged response can be generated from the initial response where the second abridged response is shorter than the first abridged response. For example, a first abridged response of "ok, turning them off" can be determined from an initial response of "ok, turning 22 lights off *ding*". As the familiarity measure dynamically changes over time, a second abridged response of "ok, *ding*" can be determined from the initial response. The length of the abridged response can continue to decrease and/or increase over time in response to the changing value of the dynamic familiarity measure. Accordingly, various implementations set forth techniques that adapt human/automated assistant Interactions in a manner that seeks to provide assistant responses that are efficient to transmit and/or render—while also ensuring that assistant responses are adapted to a current familiarity measure (thereby mitigating the chance that the user will request further clarification, leading to consumption of further resources).

Turning now to FIG. 1, an example environment is illustrated where an automated assistant response can be dynamically adapted using a dynamic familiarity measure. FIG. 1, includes a client computing device 102, which executes an instance of an automated assistant client 104. One or more could-based automated assistant components 114 can be implemented on one or more computing systems (collectively referred to as a "cloud" computing system) that are communicatively coupled to client device 102 via one or more local and/or wide area networks (e.g., the Internet) indicated generally at 112.

An instance of an automated assistant client 104, by way of its interactions with one or more cloud-based automated assistant components 114, may for what appears to be, from the user's perspective, a logical instance of an automated assistant 100 with which the user may engage in a human-to-computer dialog. An instance of such an automated assistant 100 is depicted in FIG. 1. It thus should be understood that in some implementations, automated assistant 100 may respond to a request from any user regardless of whether the user is actually "served" by that particular instance of automated assistant 100.

The client computing device 102 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 102 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application programming interface) with the automated assistant 107, or include their own instance of an automated assistant application (that may also interface with the cloud-based automated assistant component(s) 114).

Automated assistant 100 engages in human-to-computer dialog sessions with a user via a user interface input and output devices of the client device 102. To preserve user privacy and/or to conserve resources, in many situations a user must often explicitly invoke the automated assistant 100 before the automated assistant will fully process a spoken utterance. The explicit invocation of the automated assistant 100 can occur in response to certain user interface input received at the client device 102. For example, user interface inputs that can invoke the automated assistant 100 via the client device 102 can optionally include actuations of a hardware and/or virtual button of the client device 102. Moreover, the automated assistant client can include one more local engines 110, such as an invocation engine that is operable to detect the presence of one or more spoken invocation phrases. The invocation engine can invoke the automated assistant 100 in response to detection of one of the spoken invocation phrases. For example, the invocation engine can invoke the automated assistant 100 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 102, to monitor for an occurrence of a spoken invocation phrase. While monitoring for the occurrence of the spoke invocation phrase, the invocation engine discards (e.g., after temporary storage in a buffer) any audio data frames that do not include the spoken invocation phrase. However, when the invocation engine detects an occurrence of a spoke invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines 110 and/or cloud based automated assistant components 114 to further process audio data frames based on which the invocation phrase was detected, and/or one or more following audio data frames (whereas prior to invoking no further processing of audio data frames was occurring).

The one or more local engine(s) 110 of automated assistant 100 are optional, and can include, for example, the invocation engine described above, a local speech-to-text ("STT") engine (that converts captured audio data to text), a local text-to-speech ("TTS") engine (that converts text to speech), a local natural language processor (that determines semantic meaning of audio and/or text converted from audio), and/or other local components. Because the client device 102 is relatively constrained in terms of computing resources (e.g., processor cycles, memory, battery, etc.), the local engines 110 may have limited functionality relative to any counterparts that are included in cloud-based automated assistant components 114.

Cloud-based automated assistant components 114 leverage the virtually limitless resources of the cloud to perform more robust and/or more accurate processing of audio data, and/or other user interface input, relative to any counterparts of the local engine(s) 110. Again, in various implementations, the client device 102 can provide audio data and/or other data to the cloud-based automated assistant components 114 in response to the invocation engine detecting a spoken invocation phrase, or detecting some other explicit invocation of the automated assistant 100.

The illustrated cloud-based automated assistant components 114 include a cloud-based TTS module 116, a cloud-based STT module 118, a natural language processor 120, a dialog state tracker 122, and a dialog manager 124. The illustrated cloud-based automated assistant components 114 also include the familiarity engine 106 that utilizes model 108 in dynamically generating a user familiarity measure based on user parameters. In some implementations, one or more of the engines and/or modules of automated assistant 100 may be omitted, combined, and/or implemented in a component that is separate from automated assistant 100. For example, in some implementations, the familiarity engine 106 and/or the model 108 can be implemented, in whole or in part, on the client device 102. Further, in some implementations automated assistant 100 can include additional and/or alternative engines and/or modules.

Familiarity engine 106 can dynamically determine a familiarity measure by processing parameters using a machine learning model 108. Additionally or alternatively, familiarity engine 106 can be utilized in determining parameter(s) corresponding with one or more intents, and determining a response to the intent based on the familiarity measure.

Cloud-based STT module 118 can convert audio data into text, which may then be provided to natural language processor 120. Additionally or alternatively, cloud-based TTS module 116 can convert textual data (e.g., natural language responses formulated by automated assistant 100) into computer-generated speech output. In some implementations, TTS module 116 may provide the computer-generated speech output to client device 102 to be output directly, e.g., using one or more speakers. In other implementations, textual data (e.g., natural language responses) generated by automated assistant 100 may be provided to one of the local engine(s) 110, which may then convert the textual data into computer-generated speech that is output locally.

Natural language processor 120 of automated assistant 100 processes free form natural language input and generates, based on the natural language input, annotated output for use by one or more other components of the automated assistant 100. For example, the natural language processor 120 can process natural language free-form input that is textual input that is a conversion, by STT module 118, of audio data provided by a user via client device 102. The generated annotated output may include one or more annotations of the natural language input and optionally one or more (e.g., all) of the terms of the natural language input.

In some implementations, the natural language processor 120 is configured to identify and annotate various types of grammatical information in natural language input. For example, the natural language processor 120 may include a part of speech tagger (not depicted) configured to annotate terms with their grammatical roles. Also, for example, in some implementations the natural language processor 120 may additionally and/or alternatively include a dependency parser (not depicted) configured to determine syntactic relationships between terms in natural language input.

In some implementations, the natural language processor 120 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 120 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 120 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 120 may rely on annotations from one or more other components of the natural language processor 120. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 120 may use related prior input and/or other related data outside of the particular natural language input to determine one or more annotations.

In some implementations, dialog state tracker 122 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 122 may be configured to map a current dialog state, e.g., provided by dialog state tracker 122, to one or more "responsive actions" of a plurality of candidate responsive actions that are then performed by automated assistant 100. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 100 outputting additional natural language dialog, non-speech sounds (e.g., "dings"), and/or graphical indication(s). This responsive dialog may include, for instance, requests that the user provide parameters for some action (i.e., fill slots) that dialog state tracker 122 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

As described herein, when responsive actions include content to be rendered responsive to a user input, such content can be generated based on a dynamically determined familiarity measure. For example, the content can be selected, from a plurality of candidate content items each mapped to corresponding familiarity measure(s), based on the selected content being mapped to the dynamically determined familiarity measure. Also, for example, the content can be generated by modifying initial/standard content to an extent that is determined based on the determined familiarity measure and/or using techniques that are selected based on the determined familiarity measure. Moreover, when the responsive action(s) include a command to a peripheral device, such command can optionally be generated based on historical actions of the user, if the familiarity measure of the user also satisfies one or more thresholds.

Figure 2:
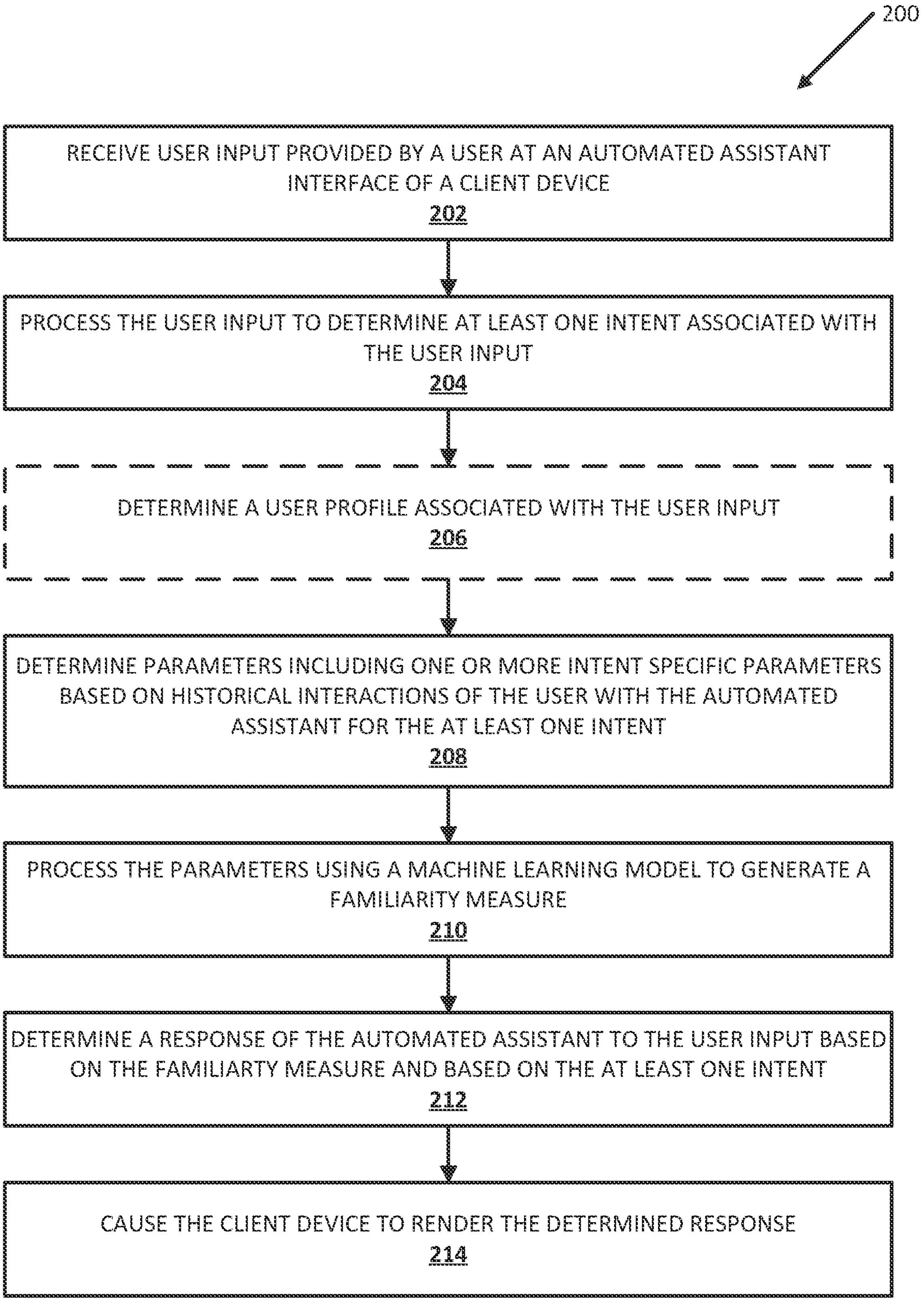
FIG. 2 is a flowchart illustrating an example process according to implementations disclosed herein.

FIG. 2 is a flowchart illustrating an example process 200 according to implementations disclosed herein. For convenience, the operations of the flowchart are described with reference to a system that performs the operations. This system may include various components of various computer systems, such as one or more components of computing systems that implement automated assistant 100. Moreover, while operations of process 200 are shown in a particular order, this is not meant to be limiting. One or more operations may be reordered, omitted, and/or added.

At block 202, the system receives user input provided by a user at an automated assistant interface of a client device. User input can include a variety of types of input including spoken input, gesture input, text input, physical input, a combination of types of input, and/or additional types of user input. For example, user input can include natural language speech that is spoken by a user and captured by at least one microphone of a client device.

At block 204, the system processes the user input to determine at least one intent associated with the user input. In many implementations, user input can include a single intent. For example, a user can provide a gesture of flipping on a light switch, which can be processed to determine an intent of turning on a light. Also, for example, a user can provide a spoken input of "turn off the smart plug". The spoken input can be converted to text, and the text processed to determine an intent of turning off a smart plug. Additionally or alternatively, user input can include multiple intents. For example, a user can provide spoken input of "turn on all the lights and play 'Hypothetical Song'" which includes intents for both turning on lights as well as playing a song. An intent can be determined in many ways including one or more engines of an automated assistant such as dialog manager 124 as described with respect to FIG. 1.

In some implementations, at block 204 only the intents specified by the user input are determined. For example, for the user input of "dim the lights", only the intent(s) of "dimming" and/or of "dimming light(s)" can be determined. In some implementations, at block 204 one or more related intents are additionally or alternatively determined. In implementations where related intent(s) are determined, the related intent(s) can be utilized in determining the intent specific parameter(s) (utilized in determining the intent specific familiarity measure), while the intent specified in the user input can be utilized in determining the response (that can be tailored to the familiarity measure). An intent can be related to an intent specified in a user input if it is a genus intent of the specified intent. For example, "control smart light(s)" is a genus intent of "turn on smart light(s)", "dim smart light(s)", and "change color of smart light(s)"). Also, for example, "weather forecast" is a genus intent of "today's forecast", "3 day forecast", and "5 day forecast". An intent can additionally or alternatively be related to an intent specified in a user input if it relates to control of the same devices and/or device type(s). For example, "turn on smart light(s)" can be related to "dim smart light(s)" since both intents relate to control of smart light(s). Additional and/or alternative techniques can be utilized to determine intent(s) that are related to an intent specified in a user input. In various implementations, a stored taxonomy of intents can be accessed to identify intents that are related to an intent specified in a user input. The stored taxonomy, for example, can identify genus intents and species of those genus intents and/or can identify intents that relate to control of the same devices and/or device type(s).

At block 206, the system optionally determines a user profile associated with the user input. For example, spoken input can be processed (e.g., processed by an additional machine learning model) to generate output associated with the spoken input. The user profile associated with the user input can be selected by comparing the output with one or more user profiles associated with the client device. For example, the output can be an embedding of the spoken input, can be compared with a speaker embedding stored with a given user profile, and the given user profile selected if the output and the stored speaker embedding satisfy a closeness threshold. As another example, the user profile can be selected based on other biometric techniques (e.g., facial recognition) with permission of the user, based on a user provided pin or other verification, and/or based on other user authentication technique(s). Once a user profile has been determined, the system can determine parameter(s) associated with the user profile. The parameter(s) associated with the user profile can include, for example, a total number of interactions the user profile has had with the automated assistant across all client devices, the frequency at which the user profile has invoked a variety of intents, etc.

At block 208, the system determines parameters including one or more intent specific parameters based on historical interactions of the user with the automated assistant for the intent(s) determined at block 204. Parameters can include a variety intent specific parameters as well as a variety of intent agnostic parameters. For example, intent specific parameters can include a measure of how frequently the intent(s) are invoked, how long since the user last invoked the intent(s), etc. Intent agnostic parameters can include measures of the length of time since a user profile invoked an automated assistant, how frequently the user invokes the automated assistant, the type of client device, etc. For example, a measure indicating the length of time since an intent was last invoked is an intent related parameter, while a measure indicating the length of time since an automated assistant was invoked (for any intent) is an intent agnostic parameter.

In implementations where intent specific parameters are determined at block 208, the familiarity measure generated at block 210 will be specific to the intent. For example, the machine learning model can accept, as input, a plurality of parameters, including one or more that are intent specific parameters. For instance, the machine learning model can accept intent specific parameters that include: a number of days since the intent specified by the user input was last utilized by the user; a total quantity of times that the intent specified by the user input has been utilized by the user; the total quantity of times that the intent specified by the user input has been utilized in the last 30 days, divided by 30; and a total quantity of times any related intents have been utilized by the user. If the user input at a given time specifies an intent of "dimming lights", first intent specific parameters will be determined. On the other hand, if the user input at the given time specifies an intent of "obtaining a ride-sharing ride", disparate second intent specific parameters will be determined. Accordingly, even though the non-intent specific parameters processed using the machine learning model at the given time will be the same between the two intents, different intent specific parameters will be utilized in dependence on the intent of the user input. Thus, different familiarity measures can be generated for the given time, in dependence on the intent(s) specified by the user input.

At block 210, the system processes the parameters using a machine learning model to generate a familiarity measure. In a variety of implementations, the system can process at least two intent related parameters and no intent agnostic parameters. For example, the system can process a set of parameters that includes three intent related parameters (and no intent agnostic parameters). In a variety of implementations, the system can process at least one intent related parameter and at least one intent agnostic parameter. For example, the system can process a set of parameters that includes five intent related parameters and seven intent agnostic parameters.

In many implementations, the machine learning model can be a neural network model such as a feed-forward neural network, a convolutional neural network, and/or an additional type of neural network. In many implementations, the machine learning model can be stored locally at a client device. In many implementations, the machine learning model can be stored remotely from a client device. In some implementations, a single machine learning can be utilized to process familiarity measure(s) for all intents, but can result in different familiarity measures for different intents at a given time based at least in part on varying intent specific parameters for the different intents. In some implementations, several machine learning models can be trained, each model trained to generate a familiarity measure for one or more corresponding specific intent(s). In many implementations, a single machine learning model can be utilized determine familiarity measure(s) for each user of a group of users (e.g., all users). In many implementations, each user profile can be associated with an individual machine learning model trained to generate familiarity measure(s) specifically for the user profile. For example, a "base" machine learning model can be adapted to a specific user based on feedback provided by that specific user during use of the machine learning model in generating adapted responses for the specific user.

At block 212, the system determines a response of the automated assistant to the user input based on the familiarity measure and based on the at least one intent. In a variety of implementations, an initial response can be determined for the user input, and an abridged version of the response can be determined using the familiarity measure. In a variety of implementations, the initial response can be determined at a system remote from the client device such as one or more cloud based automated assistant component(s) 114 of FIG. 1. In some of those implementations, the remote system can determine the abridged version of the response using the familiarity measure and only transmit the abridged version of the response to the client device for rendering to the user. In some other implementations, the remote system can transmit the entire initial response to the client device, and one or more engines of the client device can determine the abridged version of the initial response.

In implementations where the initial response is modified to generate an abridged version of the response, one or more techniques can be utilized to automatically modify the initial response. For example, pronominalization can be utilized to replace a noun, in text of the response, with a pronoun that may have less characters than the noun. Also, for example, text summarization can additionally or alternatively be utilized to convert text to a shortened version of the text. Such shortened and/or pronominalized text can be provided as the response, and/or computer generated speech, generated based on the text, can be provided as the response. As another example, all text and/or computer generated speech from the initial response can be removed and a preexisting (in the initial response) non-speech sound can be the only response rendered, or a non-speech sound (not preexisting in the initial response) can be selected for utilization in the response. As yet another example, in some situations where the familiarity measure is indicative of a high degree of familiarity, no response can be provided. In some implementations, the technique(s) employed and/or application of such technique(s) can be based on a magnitude of the familiarity measure. For example, assume the familiarity measure is a number from zero to one and greater numbers indicate greater familiarity. In such an example, familiarity measures from 0.00-0.20 can result in no modification of the initial response, measures from 0.21-0.35 can result in modification utilizing only pronominalization, measures from 0.36-0.50 can result in modification utilizing summarization to a first extent, measures from 0.50-0.75 can result in modification utilizing summarization to a second extent that is more aggressive than the first extent (i.e., leading to less terms than the first extent), measures from 0.76-0.90 can result in modification by omitting all text and only including preexisting or selected non-speech sound(s), and measures from 0.90-1.00 can result in modification by not providing any response.

In many implementations, an initial response can be provided by a third party that is in addition to the party that controls the automated assistant. For example, in response to user input of "How long will it take third-party ride-sharing company to get a car to my house", the automated assistant can interface with a system of the third-party ride sharing company to receive an initial response, from the third-party system, of "A standard car can be at your house in approximately 10 minutes". For example, the automated assistant can send a structured intent request to the third-party system using an application programming interface (API), and receive the initial response responsive to the structured intent request. The automated assistant can then optionally abridge the initial response, in dependence on the familiarity measure (e.g., generate an abridged response of "approximately 10 minutes"). In some implementations, the third party can be provided with the familiarity score (and/or parameters to determine a familiarity score) and can provide the abridged version of the response in lieu of the initial response. For example, the automated assistant can send a structured intent request to the third-party system, along with the familiarity measure, to enable the third-party system to generate an abridged response if appropriate for the familiarity measure.

Instead of generating an abridged response based on modifying an initial response, other implementations can generate a response for a familiarity measure, based on that response being mapped to the familiarity measure. For example, the user input of "turn off the [light(s)]" can be mapped to response options of: (a) "Ok, turning off [total number of smart lights] lights", (b) "OK, turning them/it off", and (c) "*ding*" (non-speech sound only). Further, response option (a) can be mapped to a first range of familiarity measures (e.g., 0.0-0.40 where the familiarity measure is a number from 0 to 1 with higher numbers indicating greater familiarity), response option (b) can be mapped to a second range of familiarity measures (e.g., 0.41-0.70), and response option (c) can be mapped to a third range of familiarity measures (e.g., 0.71-1.0). Accordingly, in such an example the response option can be selected based on being mapped to the current familiarity measure of the user.

At block 214, the system causes the client device to render the determined response. In some implementations, the client device directly renders the response. In some implementations, the client device renders output based on the response. For example, the client device, using a text-to-speech engine, can convert a textual response into spoken output. Also, for example, the server can provide the response as audio data (including computer generated speech and/or non-speech sound(s)) and provide the audio data to the client device for rendering. By selecting an appropriate response based on a familiarity measure, the amount of data such as audio data transmitted to the client device may be adapted in order to make better use of network resources. Moreover, as well as preventing the transmission of unnecessarily detailed audio feedback where it is not required, limiting this transmission may reduce the time during which a communication channel need be established between the client device and server. This may improve the usage of both network and server resources.

As described herein, in various implementations the system also performs one or more additional responsive action (s) responsive to the user input. For example, where the intent of the user input is to control smart device(s), the system can provide command(s) to cause the smart device(s) to be controlled. As further described herein, in some of those various implementations the provided command(s) can, if the familiarity measure satisfies a threshold, be based on past response(s), of the user, to less abridged response(s) for the same intent (and optionally same value(s) for the intent). For example, the more abridged response can omit a request of the user to specify a particular degree to which state(s) of a smart device are to be altered and, as a result, past input(s) of the user can instead be utilized to infer the degree and to incorporate the degree in the command(s) provided. For instance, less abridged previously provided responses (for prior familiarity measures) for user input of "dim the lights" may have prompted a user to specify a percentage to dim the lights. The more abridged version may omit such a prompt, and the percentage specified by the user in prior responses can be utilized.

In some implementations, one or more weights of the machine learning model used in generating the familiarity measure (block 210) can be updated based on the user's satisfaction and/or dissatisfaction with the rendered response, as indicated by analysis of further user inputs and/or sensor data following rendering of at least part of the response. The system can generate one or more feedback values that are indicative of a reaction by the user to the given response, and use the feedback values to update the machine learning model. User reactions may come in various forms. In some implementations, a user reaction can take the form of the user providing additional user input. In some of those implementations, characteristics of the additional user input can be utilized to infer an actual familiarity level of the user, the actual familiarity level of the user compared to the generated familiarity level (used to generate the response), and the comparison utilized to generate an error for updating weight(s) of the machine learning model. For example, if the inferred familiarity level of the user is the same as the actual familiarity measure, the model may not be updated. However, if the inferred familiarity level of the user is different than the actual familiarity level, an error can be utilized to update the model, optionally with the error being based on the extent of the difference between the inferred and actual familiarity measure.

As one example, if an abridged response is provided and the additional user input indicates a different intent and is provided following fully rendering of the abridged response, this can be interpreted as positive feedback with respect to the abridged response. For instance, the intent of additional user input of "increase the temperature by five degrees" is different than the intent of user input "turn off the light". This change in intents between user input and additional user input can provide feedback that the user understood a response for the intent of turning off the light (e.g., that the response was appropriate given the user's familiarity). In contrast, additional user input of "I said increase the temperature by five degrees" following original user input of "increase the temperature by five degrees" can provide feedback the user did not understand an abridged response to the original user input (e.g., that the response was too abridged given the user's actual familiarity). As a result, this can be interpreted as negative feedback and corresponding error utilized to update the machine learning model. For instance, the error can be based on the generated familiarity measure as compared to an inferred familiarity measure that is less indicative of familiarity than the generated familiarity measure. As another example, if a response (abridged or non-abridged) is provided and the additional user input indicates a different intent and is provided before the response is fully rendered, this can indicate that the response was not abridged enough (since the intent of the additional input is different, but the user started providing the additional input before the response was fully rendered—indicating the user was already familiar with the response). As a result, this can also be interpreted as negative feedback and corresponding error utilized to update the machine learning model. For instance, the error can be based on the generated familiarity measure as compared to an inferred familiarity measure that is more indicative of familiarity than the generated familiarity measure.

Additional or alternative user reactions can be utilized to generate feedback values. For example, in some implementations the user can be prompted to provide explicit feedback on the appropriateness of the response for the familiarity level, and the explicit feedback utilized to generate the feedback values. For example, a prompt of "was the level of detail in this response appropriate?" can be provided, and the feedback value adapted based on the response to the prompt. The prompt can be visual and/or audible, and the feedback can be, for example, spoken input and/or selection of a corresponding graphical element. For instance, a "yes" spoken response or selection response can be utilized as a positive feedback signal (e.g., no update to the model), and a "no" response utilized as a negative feedback signal (e.g., update weights of the model using a "standard" error). As another example, the user's tone in subsequent speech can be utilized to generate the feedback. For instance, the user's immediately subsequent speech can be processed to determine if it indicates frustration and, if so, the feedback values can be generated to indicate the familiarity level was not appropriate. In other words, the weights of the model can be updated responsive to frustration and/or other characteristic(s) being present in spoken input that follows (e.g., immediately follows) rendering of the response.

Figure 3:
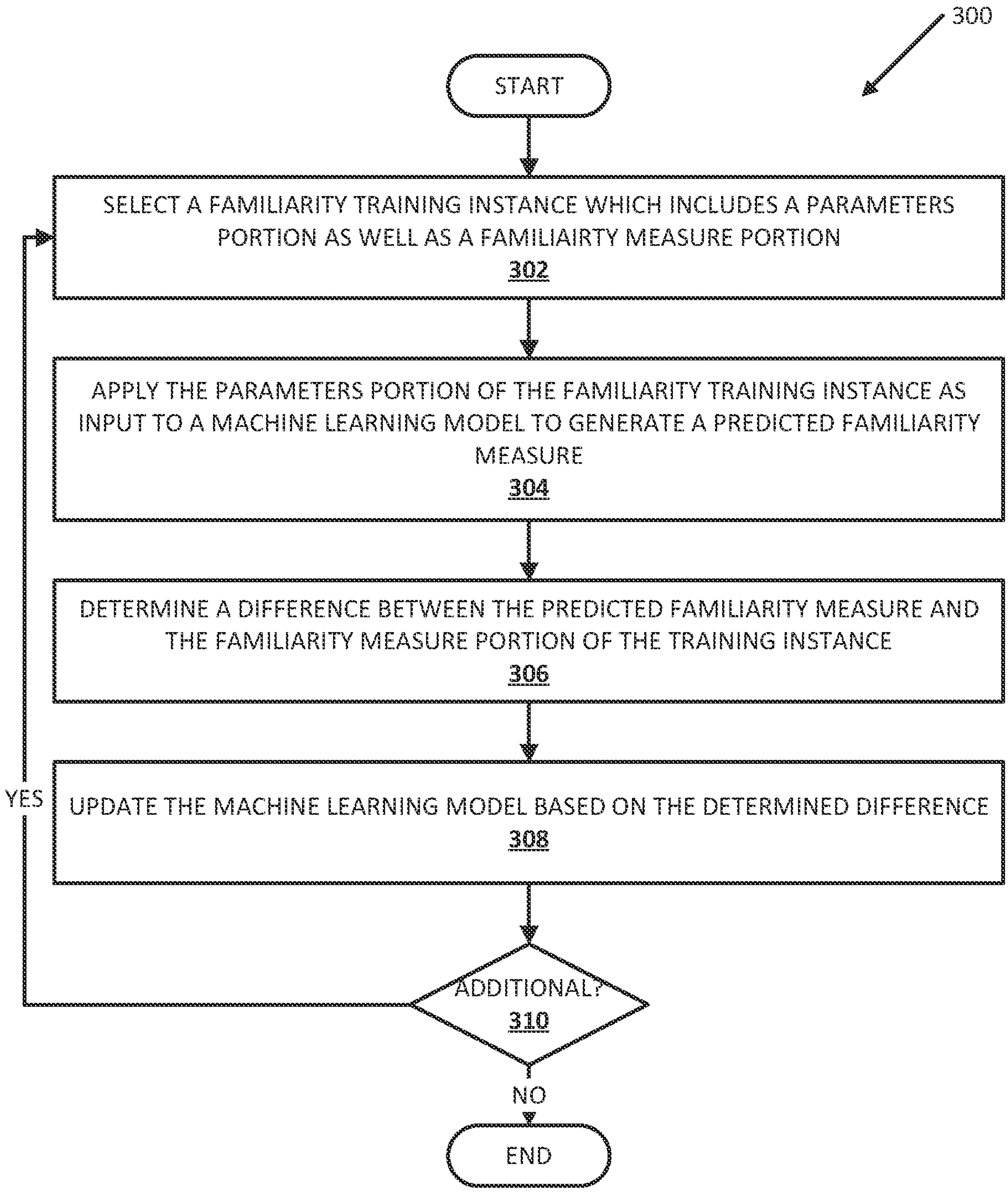
FIG. 3 is another flowchart illustrating another example process according to implementations disclosed herein.

FIG. 3 is a flowchart illustrating an example process 300 according to implementations disclosed herein. For convenience, the operations of the flowchart are described with reference to a system that performs the operations. This system may include various components of various computer systems, such as one or more components of computing systems that implement automated assistant 100. Moreover, while operations of process 300 are shown in a particular order, this is not meant to be limiting. One or more operations may be reordered, omitted, and/or added.

At block 302, the system selects a familiarity training instance which includes a parameters portion as well as a familiarity measure portion. In many implementations, the parameters portion includes at least one intent related parameter as well as additional intent related parameters and/or intent agnostic parameters. Additionally, the training instance includes a familiarity measure portion, which indicates a resulting familiarity measure corresponding with the parameters included in the parameters portion of the training instance. In many implementations, the familiarity measure portion of the training instance can be labeled based on user interface input provided by a human (or several humans). For example, a first human can determine a first familiarity measure from the given parameters portion of the training instance, a second human can determine a second familiarity measure from the given parameters portion of the training instance, etc., and the familiarity measure portion of the training instance can be determined as the average of the first familiarity measure, second familiarity measure etc.

At block 304, the system applies the parameters portion of the familiarity training instance as input to a machine learning model to generate a predicted familiarity measure. In many implementations, the machine learning model can be initialized (e.g., as prior to beginning any training) with hand tuned parameters provided by a human.

At block 306, the system determines a difference between the predicted familiarity measure and the familiarity measure portion of the training instance.

At block 308 the system updates the machine learning model based on the determined difference. For example, the system can update one or more weights of the machine learning model based on the determined difference. For instance, the system can update weights of the machine learning model by backpropagation of an error that is based on the determined difference.

At block 310, the system determines whether to select an additional training instance. If so, the system proceeds back to block 302 and selects a different familiarity training instance, and proceeds to blocks 304, 306, and 308. In some implementations, the system can determine to select an additional training instance if there are one or more additional unprocessed training instances and/or if other criterion/criteria are not yet satisfied. The other criterion/criteria can include, for example, whether a threshold number of epochs have occurred and/or a threshold duration of training has occurred. Although process 300 is described with respect to a non-batch learning technique, batch learning may additionally and/or alternatively be utilized. If, at an iteration of block 310, the system determines not to select an additional training instance, the process 300 ends.

Process 300 of FIG. 3 describes training the machine learning model utilizing supervised training examples where reviewers can assign labels that indicate the ground truth familiarity measure. However, in various implementations, the machine learning model can additionally or alternatively be trained using feedback from users during deployment of the machine learning model, as described above. For example, even though some (or all) of the feedback provided by the users may not explicitly indicate a "ground truth" familiarity measure that should have been determined, feedback can nonetheless be utilized to determine if a corresponding generated familiarity measure was appropriate, and to update weights of the model if not. In other words, the user feedback can be utilized as a reward signal and the reward signal applied to a reward function that can be utilized to update the model in a semi-supervised learning approach. Through multiple iterations of training based on such reward signals, the machine learning model can converge to provide accurate and robust familiarity measures. In some implementations, the machine learning model can be initially trained utilizing process 300 of FIG. 3, then further trained using feedback during deployment. In some other implementations, the machine learning model can be trained utilizing feedback and without first being trained utilizing the process 300 of FIG. 3.

Figure 4:
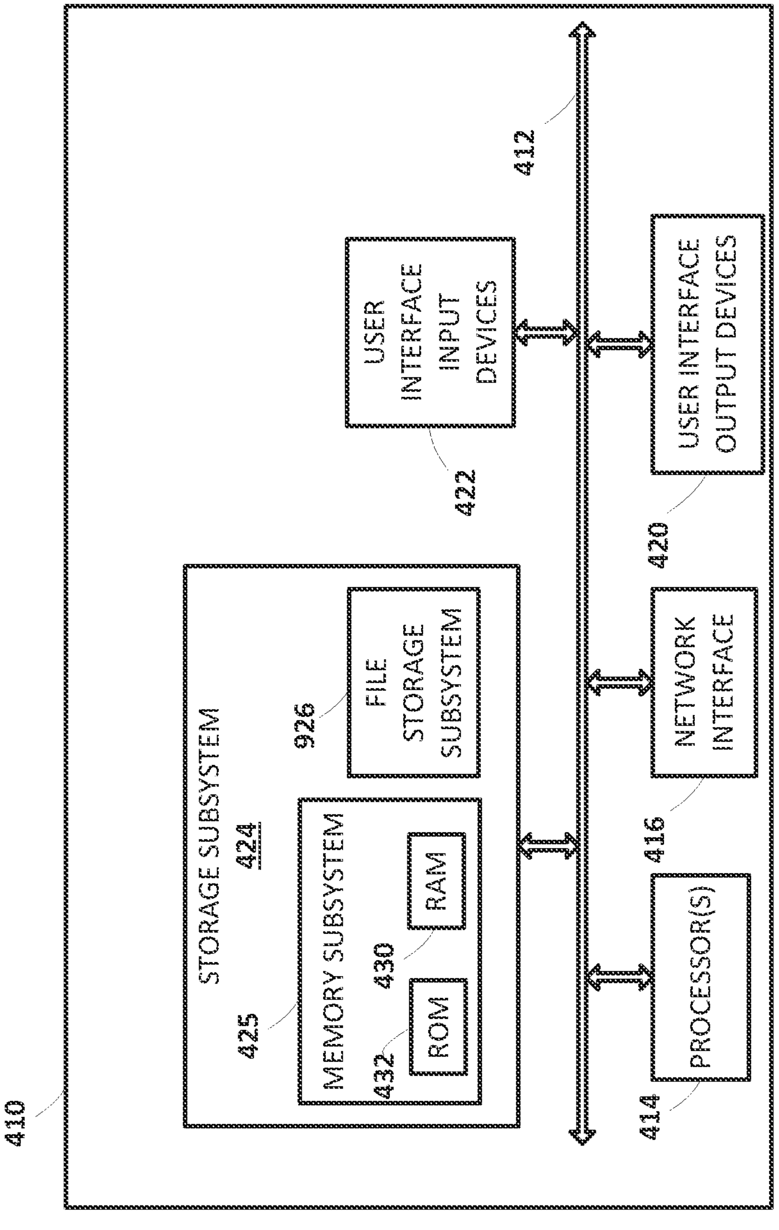
FIG. 4 is a block diagram illustrating an example architecture of a computing device.

FIG. 4 is a block diagram of an example computing device 410 that may optionally be utilized to perform one or more aspects of techniques described herein. In some implementations, one or more of a client computing device, and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 424 stores programming and data constructs that provide the functionality of some or all of the modules described herein. For example, the storage subsystem 424 may include the logic to perform selected aspects of one or more of the processes of FIGS. 2-3, as well as to implement various components depicted in FIG. 1.

These software modules are generally executed by processor 414 alone or in combination with other processors. Memory 425 used in the storage subsystem 424 can include a number of memories including a main random access memory ("RAM") 430 for storage of instructions and data during program execution and a read only memory ("ROM") 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes receiving user input. The user input is provided by a user at an automated assistant interface of a client device, and the automated assistant interface is an interface for interacting with an automated assistant executing on the client device and/or one or more remote computing devices. The method further includes processing the user input to determine at least one intent associated with the user input, and generating a familiarity measure for the at least one intent. Generating the familiarity measure for the at least one intent includes processing, using a machine learning model, a plurality of parameters to generate the familiarity measure. The plurality of parameters processed using the machine learning model to generate the familiarity measure include one or more intent specific parameters that are based on historical interactions, of the user with the automated assistant, for the at least one intent. The method further includes determining a response, of the automated assistant to the user input, based on the familiarity measure and based on the at least one intent. The method further includes causing the client device to render the determined response.

These and other implementations of the technology disclosed herein can include one or more of the following features.

In some implementations, determining the response based on the familiarity measure and based on the determined at least one intent includes determining whether the familiarity measure satisfies a threshold. In some of those implementations, when the familiarity measure fails to satisfy the threshold the method further includes including, in the response: computer generated speech that is responsive to the intent, or text that is converted to computer generated speech when the client device renders the determined response. In some of those implementations, when the familiarity measure satisfies the threshold, the method further includes: omitting, from the response, any computer generated speech and any text. Omitting any computer generated speech and any text can optionally include removing, from an initial response, any computer generated speech and/or any text.

In some implementations, determining the response based on the familiarity measure and based on the determined at least one intent includes: determining, based on the determined intent, an initial response that includes a first quantity of bytes; and responsive to determining the familiarity measure satisfies a threshold: modifying the initial response to generate an abridged response that includes a second quantity of bytes that is less than the first quantity of bytes. In some of those implementations, modifying the initial response to generate the abridged response includes: removing, from the initial response, any computer generated speech or any text that is converted to computer generated speech when the client device renders the determined response; replacing a noun in the text with a pronoun that has less characters than the noun, and/or performing text summarization to convert the text to a shortened version of the text.

In some implementations, determining the response occurs atone or more servers of the automated assistant that are remote from the client device, and causing the client device to render the response includes transmitting, by one or more of the servers over one or more networks, the response to the client device.

In some implementations, the user input is a spoken user input, and the method further includes: processing the spoken user input, or a spoken invocation that precedes the spoken user input, to determine that the spoken user input corresponds to a user profile that is accessible to the automated assistant; and responsive to determining that the spoken user input corresponds to the user profile: determining one or more (e.g., all) parameters in the plurality of parameters based on data that is stored in association with the user profile.

In some implementations, the method further includes determining one or more intent agnostic parameters that are each determined without regard to the determined intent, and the parameters that are processed using the machine learning model in generating the familiarity measure further include the one or more intent agnostic parameters. In some of those implementations, determining the one or more intent agnostic parameters includes determining at least one of the intent agnostic parameters based on additional historical interactions, of the user with the automated assistant, including historical interactions that do not correspond to the determined at least one intent. In some versions of those implementations, determining the one or more intent agnostic parameters includes determining at least one of the intent agnostic parameters based on an amount of the additional historical interactions between the user and the automated assistant. In some of those versions, the one or more intent agnostic parameters determined based on the amount of historical interactions between the user and the automated assistant include one or more intent agnostic parameters that are based on a total number of the additional historical interactions and/or a frequency of the additional historical interactions.

In some implementations, determining the one or more intent specific parameters includes determining at least one of the intent specific parameters based on an amount of the historical interactions between the user and the automated assistant for the at least one intent and/or a length of time since a most recent interaction between the user and the automated assistant for the at least one intent. In some of those implementations, the one or more intent specific parameters include a plurality of intent specific parameters, including at least one that is based on the amount of the historical interactions between the user and the automated assistant for the intent, and optionally including at least an additional one that is based on the length of time since the most recent interaction between the user and the automated assistant for the intent.

In some implementations, the at least one intent includes only one or more intents that are referenced by the user input.

In some implementations, the at least one intent includes one or more intents that are referenced by the user input, as well as one or more additional intents that are defined, in a stored taxonomy of intents, as related to the intent.

In some implementations, the at least one intent includes a given intent, specified in the user input, to control at least one smart device. In some versions of those implementations, determining the response based on the familiarity measure and based on the at least one intent includes: responsive to determining the familiarity measure satisfies a threshold: omitting, from the response, any prompt requesting a value for the control of the at least one smart device. In some versions of those implementations, the method further includes: automatically generating the value for the control of the at least one smart device based on one or more prior user inputs, of the user, to prior responses that were responsive to the given intent and that included the prompt; and transmitting one or more commands that are based on the automatically generated value. Transmitting the one or more commands causes control of the at least one smart device based on the automatically generated value.

In some implementations, the plurality of parameters processed using the machine learning model to generate the familiarity measure includes a current modality of the client device.

In some implementations, a method implemented by one or more processors is provided and includes receiving user input. The user input is provided by a user at an automated assistant interface of a client device, and the automated assistant interface is an interface for interacting with an automated assistant executing on the client device and/or one or more remote computing devices. The method further includes processing the user input to determine at least one intent specified by the user input and at least one value specified, by the user input, for the intent. The method further includes generating a familiarity measure. Generating the familiarity measure includes processing, using a machine learning model, a plurality of parameters to generate the familiarity measure. The plurality of parameters processed using the machine learning model to generate the familiarity measure include one or more value specific parameters that are based on historical interactions, of the user with the automated assistant, for the at least one value. The method further includes determining a response, of the automated assistant to the user input, based on the familiarity measure and based on the at least one intent. The method further includes causing the client device to render the determined response.

These and other implementations of the technology disclosed herein can include one or more of the following features.

In some implementations, the one or more value specific parameters include a given value specific parameter that is based on historical interactions, of the user with the automated assistant, for the at least one value and for multiple intents, including at least one additional intent that is in addition to the at least one intent specified by the user input.

In some implementations, the one or more value specific parameters include a given value specific parameter that is based on historical interactions, of the user with the automated assistant, for the at least one value and for the at least one intent specified by the user input.

In some implementations, the plurality of parameters processed using the machine learning model to generate the familiarity measure include one or more intent specific parameters that are based on historical interactions, of the user with the automated assistant, for the at least one intent and for multiple values, including at least one additional value that is in addition to the at least one value specified by the user input.

In some implementations, a method implemented by one or more processors is provided and includes receiving user input. The user input is provided by a user at an automated assistant interface of a client device, and the automated assistant interface is an interface for interacting with an automated assistant executing on the client device and/or one or more remote computing devices. The method further includes processing the user input to determine at least one attribute that is specified by the user input. The method further includes generating a familiarity measure. Generating the familiarity measure includes processing, using a machine learning model, a plurality of parameters to generate the familiarity measure. The plurality of parameters processed using the machine learning model to generate the familiarity measure include one or more specific parameters that are based on historical interactions, of the user with the automated assistant, for the at least one attribute. The plurality of parameters processed using the machine learning model to generate the familiarity measure include one or more agnostic parameters that are based on historical interactions, of the user with the automated assistant, including historical interactions that include attributes that are in addition to the at least one attribute. The method further includes determining a response, of the automated assistant to the user input, based on the familiarity measure and based on the at least one attribute. The method further includes causing the client device to render the determined response.

These and other implementations of the technology disclosed herein can include one or more of the following features.

In some implementations, the at least one attribute includes at least one intent and/or at least one value for the at least one intent.

What is claimed is:

1. A method implemented by one or more processors, the method comprising:

selecting a familiarity training instance, from a set of familiarity training instances, wherein the familiarity training instance includes an input parameters portion and a ground truth familiarity measure for the input parameters portion, wherein the input parameters portion includes one or more measures of user interactions with an automated assistant, including one or more intent specific measures that are based on historical interactions, of a user with the automated assistant, for one or more intents;

processing the input parameters portion of the selected familiarity training instance using a machine learning model to generate a predicted familiarity measure for the input parameters portion, wherein the predicted familiarity measure is indicative of familiarity of the user with the one or more intents;

comparing the predicted familiarity measure with the ground truth familiarity measure to generate familiarity output; and updating one or more portions of the machine learning model based on the familiarity output.

2. The method of claim 1, wherein the input parameters portion of the selected familiarity training instance includes one or more intent specific parameters indicating a measure of the user interactions with the user and the automated assistant for a specific intent.

3. The method of claim 2, wherein the one or more intent specific parameters includes a total number of interactions of the user with the automated assistant for the specific intent at a specific client device.

4. The method of claim 2, wherein the one or more intent specific parameters includes a total number of interactions of the user with the automated assistant for the specific intent at a plurality of client devices.

5. The method of claim 2, wherein the one or more intent specific parameters includes a length of time since the user last interacted with the automated assistant for the specific intent.

6. The method of claim 2, wherein the one or more intent specific parameters includes a total number of interactions of the user with the automated assistant for the specific intent and one or more related intents related to the specific intent.

7. The method of claim 1, wherein the input parameters portion of the selected familiarity training instance includes one or more intent agnostic parameters indicating a measure of the user interactions with the user and the automated assistant.

8. The method of claim 7, wherein the one or more intent agnostic parameters includes a measure of the length of time since a user profile, corresponding to the user, has invoked the automated assistant.

9. The method of claim 7, wherein the one or more intent agnostic parameters includes a measure of how frequently a user profile, corresponding to the user, invokes the automated assistant.

10. The method of claim 7, wherein the one or more intent agnostic parameters includes client device information.

11. The method of claim 1, further comprising, and subsequent to updating the one or more portions of the machine learning model:

processing user interface input using the machine learning model to generate a familiarity measure, wherein the user interface input is provided by the user at an automated assistant interface of a client device, wherein the automated assistant interface is an interface for interacting with an automated assistant executing on the client device and/or one or more remote computing devices; and causing the client device to render output based on the familiarity measure.

12. The method of claim 11, wherein processing user interface input using the machine learning model to generate the familiarity measure comprises:

receiving the user interface input provided by the user at the automated assistant interface of the client device;

processing the user interface input to determine at least one intent associated with the user interface input;

generating the familiarity measure for the at least one intent associated with the user interface input, wherein generating the familiarity measure for the at least one intent associated with the user interface input comprises:

processing, using the machine learning model, a plurality of parameters using the machine learning model to generate the familiarity measure, wherein the plurality of parameters includes one or more parameters based on historical interactions of the user with the automated assistant for the at least one intent associated with the user interface input;

determining a response of the automated assistant to the user interface input, based on the familiarity measure and the at least one intent associated with the user interface input; and causing the client device to render the determined response.

13. The method of claim 12, wherein determining the response based on the familiarity measure and the at least one intent associated with the user interface input comprises:

determining whether the familiarity measure satisfies a threshold;

when the familiarity measure fails to satisfy the threshold:

including, in the response:

computer generated speech that is responsive to the at least one intent associated with the user interface input, or text that is converted to computer generated speech when the client device renders the determined response; and when the familiarity measure satisfies the threshold:

omitting, from the response, any computer generated speech and any text.

14. The method of claim 12, wherein determining the response based on the familiarity measure and the at least one intent associated with the user interface input comprises:

determining an initial response based on the intent, wherein the initial response comprises a first quantity of bytes;

responsive to determining the familiarity measure satisfies a threshold:

modifying the initial response to generate an abridged response, wherein the abridged response comprises a second quantity of bytes that is less than the first quantity of bytes.

15. The method of claim 14, wherein modifying the initial response to generate the abridged response comprises:

removing, from the initial response, any computer generated speech or text that is converted to computer generated speech when the client device renders the determined response, replacing a noun in the text with a pronoun that has less characters than the noun, and/or performing text summarization to convert the text to a shortened version of the text.

16. A computing system, comprising:

one or more processors, and memory configured to store instructions that, when executed by the one or more processors, cause the one or more processors to perform a method that includes:

selecting a familiarity training instance, from a set of familiarity training instances, wherein the familiarity training instance includes an input parameters portion and a ground truth familiarity measure for the input parameters portion, wherein the input parameters portion includes one or more measures of user interactions with an automated assistant, including one or more intent specific measures that are based on historical interactions, of a user with the automated assistant, for one or more intents;

processing the input parameters portion of the selected familiarity training instance using a machine learning model to generate a predicted familiarity measure for the input parameters portion, wherein the predicted familiarity measure is indicative of familiarity of the user with the one or more intents;

comparing the predicted familiarity measure with the ground truth familiarity measure to generate familiarity output; and updating one or more portions of the machine learning model based on the familiarity output.

17. The computing system of claim 16, wherein the input parameters portion of the selected familiarity training instance includes one or more intent specific parameters indicating a measure of the user interactions with the user and the automated assistant for a specific intent.

18. The computing system of claim 17, wherein the one or more intent specific parameters includes a total number of interactions of the user with the automated assistant for the specific intent at a specific client device.

19. The computing system of claim 17, wherein the one or more intent specific parameters includes a total number of interactions of the user with the automated assistant for the specific intent at a plurality of client devices.

20. The computing system of claim 17, wherein the one or more intent specific parameters includes a length of time since the user last interacted with the automated assistant for the specific intent.

* * * * *